Jan. 1, 1952     T. M. BOGENSCHUTZ     2,580,397
MACHINE FOR DECAPPING HONEYCOMBS
Filed Sept. 2, 1948     3 Sheets-Sheet 1

Thomas M. Bogenschutz
INVENTOR.

BY Thomas A. O'Brien
and Harvey B. Jacobson
Attorneys

Thomas M. Bogenschutz
INVENTOR.

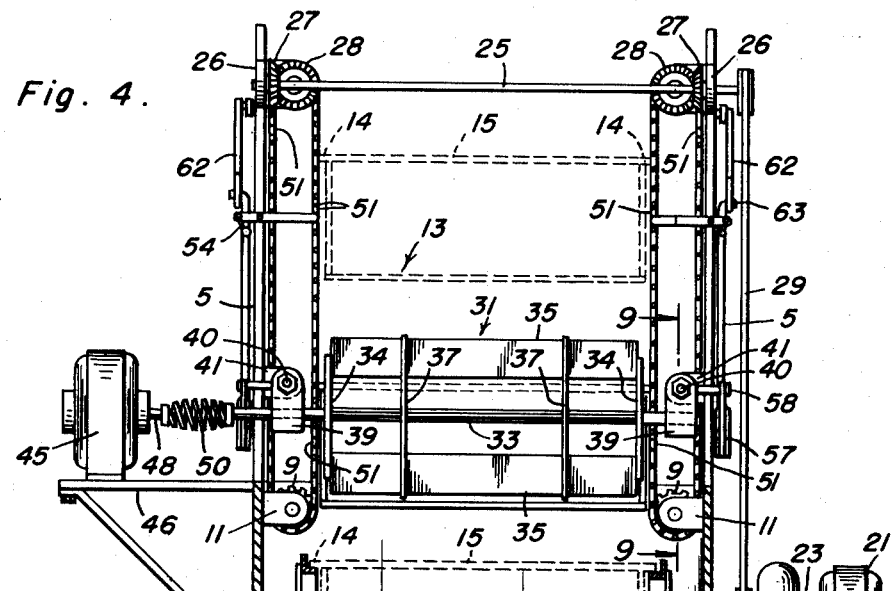
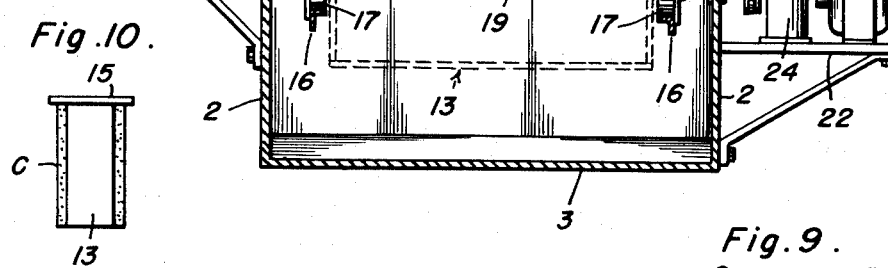
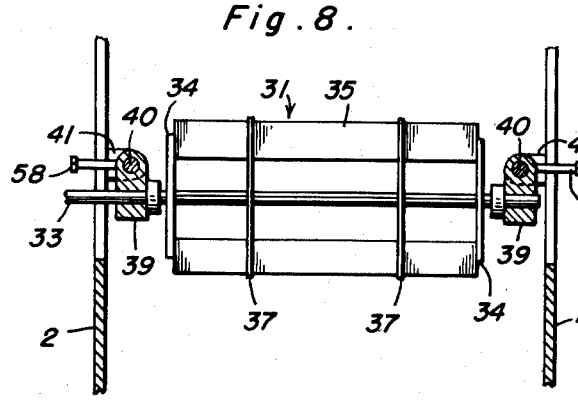
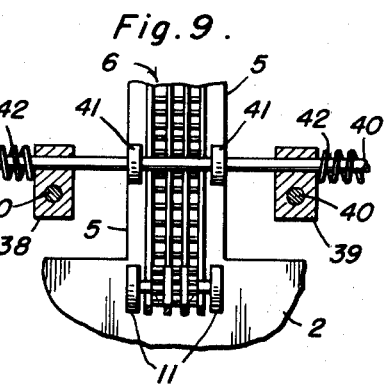

Patented Jan. 1, 1952

2,580,397

UNITED STATES PATENT OFFICE 2,580,397

MACHINE FOR DECAPPING HONEYCOMBS

Thomas M. Bogenschutz, Clayton, N. Y., assignor of twenty-five per cent to Frank A. Bogenschutz, Clayton, twenty-five per cent to Harry J. Bogenschutz, Rosiere, and twenty-five per cent to Oliver C. Bogenschutz, Clayton, N. Y.

Application September 2, 1948, Serial No. 47,391

9 Claims. (Cl. 6—12)

My invention relates to improvements in machines for decapping the cells of honeycombs so that the honey may be extracted from the combs.

The primary object of my invention is to provide a machine of simple form and inexpensive construction adapted to quickly remove the wax cappings of honeycombs in honey frames, on both sides of the combs simultaneously, and without damaging the combs or frames.

Another object is to provide a machine of the character and for the purpose specified which is equipped to decap honey in honeycomb frames fed in close succession therethrough and without jamming or otherwise getting out of order.

Other and subordinate objects, within the purview of my invention, together with the precise nature of my improvements will be readily understood when the succeeding description and claims are read with reference to the drawings accompanying and forming part of this specification.

In said drawings:

Figure 4 is a view in vertical transverse section taken on the line 4—4 of Figure 2;

Figure 8 is a fragmentary view in vertical section taken on the line 8—8 of Figure 2;

Figure 9 is a fragmentary view in vertical section taken on the line 9—9 of Figure 4; and Figure 10 is a view in end elevation of one of the honey frames with the honeycomb therein.

Figure 1:
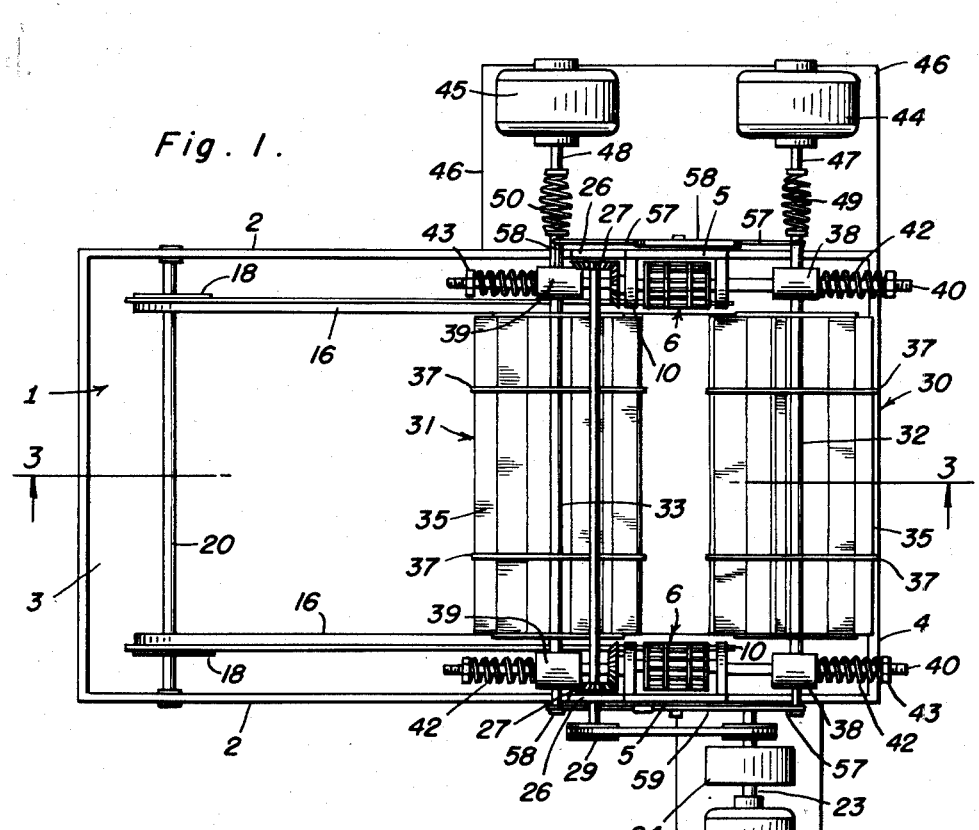
Figure 1 is a view in plan of my improved machine in the preferred embodiment thereof.

Describing my invention in detail, with reference to the drawings by numerals, 1 designates the base of the machine which is of elongated rectangular, box form, preferably, with sides 2, a bottom 3, and a front end 4. Adjacent the front end 4 of said frame 1 is a pair of uprights 5 rising from opposite sides 2 of said base.

A pair of opposite honeycomb frame conveyor chains 6 are mounted between the uprights 5 to run vertically and parallel in a common plane transverse to the base 1 with inner vertical runs 7 confronting, said conveyor chains 6 being trained around pairs of upper and lower sprocket wheels 8, 9 suitably journaled in lateral bearing brackets 10, 11 on the uprights 5 and the sides 2 of the base 1, respectively. The conveyor chains 6 are of the link belt type with links removed to provide rectangular apertures 12 between the edges of said chains. The inner runs 7 of the conveyor chains 6 are spaced apart to receive therebetween, with a slight clearance, the usual rectangular type of honey frame 13 disposed endwise between said runs 7. The apertures 12 are arranged to travel in the runs 7 in opposite pairs horizontally spaced apart in the pairs and to accommodate therein the usual projecting ends 14, shown in dotted lines in Figure 4, of the top panels 15 of said frames 13 so that the honey frames 13 may be suspended, in succession, on the runs 7 at the upper ends of the conveyor chains 6 to be lowered thereby in closely spaced relation for successive decapping of honeycomb C therein, in a manner presently described, and to then drop off said conveyor chains 6 as the pairs of apertures 12 round the lower sprocket wheels 9.

A pair of horizontal conveyor belts 16, in the base 1, extend below the conveyor chains 6 and rearwardly thereof and which are L-shaped in cross section and spaced apart transversely of the base 1 to receive on the upper runs thereof the projecting ends 14 of the honey frames 13 as said frames drop off the conveyor chains 6, and as represented in dotted lines in Figure 4.

The conveyor belts 16 are trained around front and rear pairs 17, 18 of flanged wheels on front and rear cross shafts 19, 20 suitably journaled in the sides 2 of the base 1. The front pair of wheels 17 is fast on the shaft 19 for drive thereby to drive the conveyor belts 16 so as to convey the honey frames 13 thereon rearwardly in the base 1 for removal from said belts as desired.

A suitable electric motor 21 on a side shelf 22 on the base 1 has its armature shaft 23 operatively connected, through a reduction drive 24, to the front shaft 19 to drive the front pair of wheels 17 and hence the conveyor belts 16.

Figure 5:
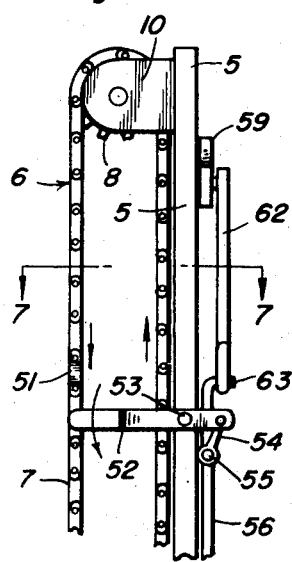
Figure 5 is a fragmentary view in front elevation drawn to a larger scale and illustrating one of the uprights and one of the conveyor chains together with parts of the reel separating mechanism shown in set position.
Figure 6:
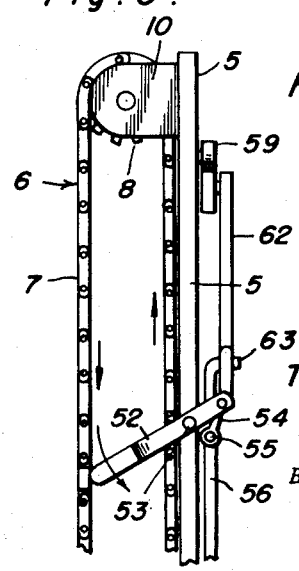
Figure 6 is a similar view with the parts of the reel separating mechanism operated from set position.
Figure 7:
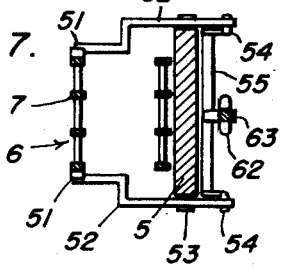
Figure 7 is a view in horizontal section taken on the line 7—7 of Figure 5.
Figures 2, 3:
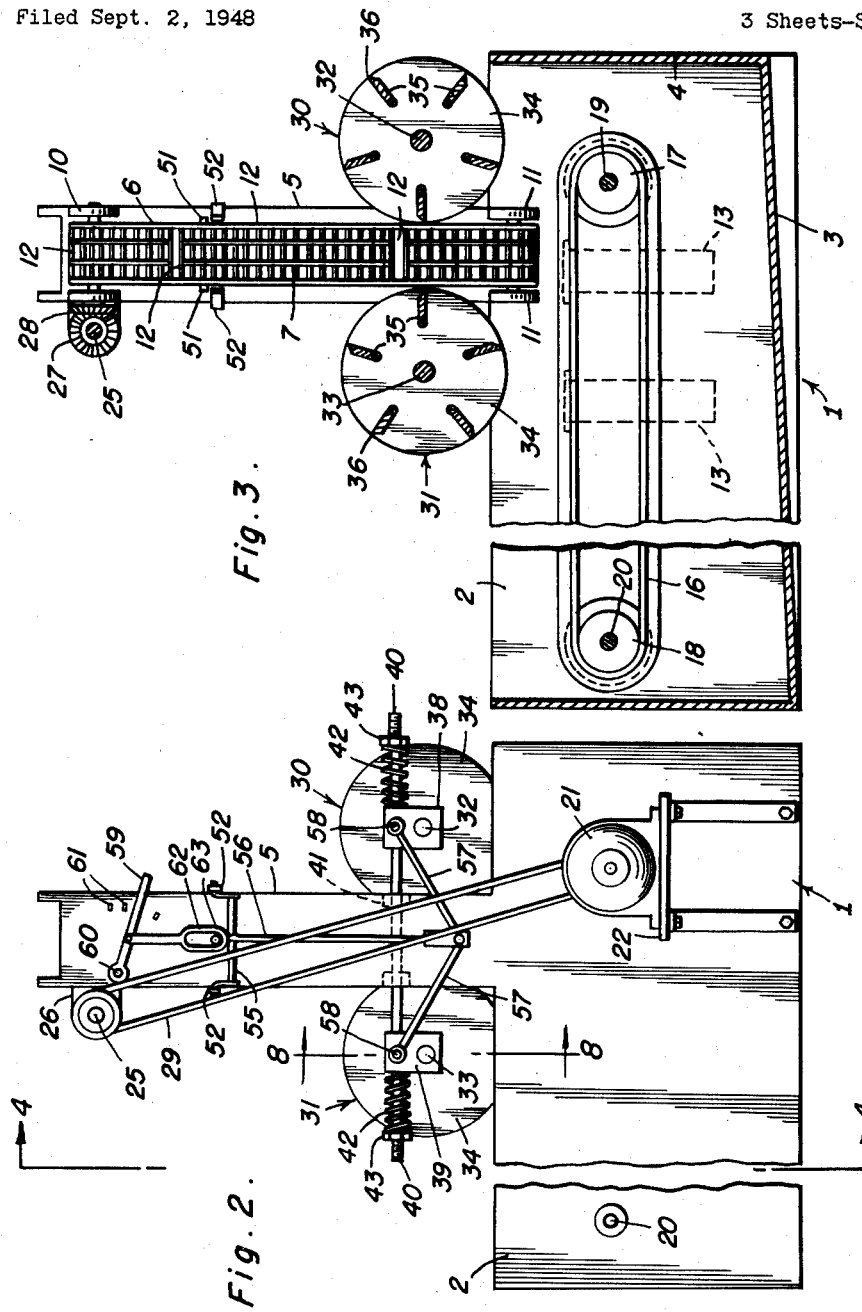
Figure 2 is a fragmentary view in side elevation.
Figure 3 is a view in vertical longitudinal section taken on the line 3—3 of Figure 1 and partly broken away.

A reduction drive for the conveyor chains 6 is provided in the form of a cross shaft 25 at the upper ends of said chains 6 journaled in bearings 26 on the uprights 5, bevel gears 27 fast on said cross shaft 25 and meshing with similar gears 28 suitably fixed to the upper sprocket wheels 8, and a belt and pulley connection 29 between the front shaft 19 and the cross shaft 25. As will be understood, the conveyor chains 6 are driven so that the runs 7 thereof travel downwardly, as represented by the arrows in Figures 5 and 6, and said chains are driven at substantially the same speed as the conveyor belts 16.

A pair of front and rear decapping reels 30, 31 extend horizontally across the base 1, above the same, in a common horizontal plane and are spaced slightly above the lower ends of the conveyor chains 6 forwardly and rearwardly thereof respectively. The decapping reels 30, 31 comprise shafts 32, 33, end disks 34 fast on said shafts 32, 33 and decapping knife bars 35 circumferentially spaced around said disks 34, equidistantly, and suitably secured at the ends thereof to said disks, with cutting edges 36 projecting beyond said disks 34. Intermediate disks 37 on the shafts 32, 33, concentric to the disks 34, project slightly beyond the cutting edges 36 of said knife bars 35 to act as fenders, in a manner presently clear.

The shafts 32, 33 of the decapping reels 30, 31 are journaled at the ends thereof in pairs of bearing blocks 38, 39 slidable on horizontal guide rods 40 fixed intermediate the ends thereof in ears 41 on the uprights 5, the arrangement being such that said reels 30, 31 are slidably mounted for horizontal movement, laterally, toward each other to engage the cutting edges 36 of the knife bars 35 with opposite sides of the honeycomb C, shown in Figure 10, as the honey frames 13 are fed downwardly in succession by the conveyor chains 6. Also, said reels 30, 31 are slidably mounted for separation to withdraw said cutting edges 36 out of the path of downward feed, or travel, of said frames 13 and for a particular purpose presently described. Helical springs 42 on the guide rods 40 interposed between the bearing blocks 38, 39 and nuts 43 on said rods yieldingly urge the decapping reels 30, 31 toward each other.

Motor drives are provided for the decapping reels 30, 31 comprising a pair of separate electric motors 44, 45 suitably mounted on a side shelf 46 on the base I, the armature shafts 47, 48 of said motors being operatively connected to corresponding ends of the shafts 32, 33 by helical spring couplings 49, 50 compensating for the described sliding movement of said reels 30, 31. The decapping reels 30, 31 are rotated to revolve the knife bars 36 downwardly opposite said frames 13.

Automatic reel separating mechanism is provided in the machine for separating the decapping reels 30, 31 in timed relation to downward travel of the top panels 15 of the honey frames 13 past the horizontal center of said reels 30, 31. This separation is provided for to prevent the knife bars 35 from mutilating the side edges of the top panels 15 of the honey frames 13 which, as is well known in the art, project past the sides of the remainder of said frames 13, whereas, the honeycomb C is built up slightly outwardly of the sides of said frames 13 by the bees and can be decapped by the revolving knife bars 35 from the bottoms of said frames upwardly, substantially to the top panels 15.

The automatic reel separating mechanism comprises suitably spaced pairs of tappets 51 on the conveyor chains 6 arranged to descend against corresponding ends of pairs of vertically rocking levers 52, a pair of which is pivoted upon each upright 5 at opposite sides thereof, as at 53, for wiping engagement by said pairs of tappets 51 to cause rocking of the same. The other ends of the pairs of levers 52 are pivotally connected to rock arms 54 on lateral arms 55 of a pair of cruciform lift members 56 suspended from said arms 54 alongside the uprights 5 and adapted to be lifted by rocking of said pairs of levers 52 by said tappets 51, the direction in which said levers are rocked being counter-clockwise as indicated by the arrows in Figures 5 and 6. Pairs of toggle links, as at 57, connect the lower ends of the lift members 56 with the pairs of bearing blocks 38, 39, by means of studs 58 on said blocks, and so that when said members 56 are lifted, said pairs of bearing blocks 38, 39 are slid on the guide rods 40 in a separative direction in opposition to the springs 42 to correspondingly separate the decapping reels 30, 31 for the purpose previously specified.

Manually operative levers 59 are pivoted, as at 60, on the uprights 5 for vertical swinging into different set positions, in cooperation with detents 61 on said uprights 5, and are operatively connected by pivoted suspended links 62 to upper crank ends 63 on the lift members 56 so that by setting of said levers 59 the lift members 57 may be lifted to set and separate the decapping reels 30, 31 a predetermined distance apart in accordance with the thickness of the honeycomb C in the honey frames 13. The links 62 provide for lost motion, vertically, of the lifting members 56 when said reels 30, 31 are further separated automatically out of set position and in the manner previously described. Manual setting of the decapping reels 30, 31 varies the normal positions of the levers 52 but not sufficiently to interfere to disadvantage with the automatic reel separating operation, since the variations in the manual setting of said reels 30, 31 are slight, the thickness of honeycomb C in honey frames 13 varying only slightly.

As will now be seen, with the decapping reels 30, 31 manually set and being driven, the knife bars 35 will be revolved to cut into and decap the cells of the honeycombs C in the honey frames 13 fed downwardly by the conveyor chains 6, and the honey frames 13 in which the honeycomb C has been decapped will then drop onto the conveyor belts 16 to be carried rearwardly in the base I for removal as desired. The decapping reels 30, 31 are tensioned, when manually set, to enter the knife bars 35 in the honeycomb C, a predetermined distance. The fender disks 37 fend the knife bars 36 away from the bottoms of the honey frames 13 as said frames descend in case the honeycomb C is defective at the bottom of the honey frames 13, or, the honeycomb C has not been built up outwardly of said bottoms. To obviate cutting of the sides of the honey frames 13, the decapping reels 30, 31 are of a length to enter said frames with a slight clearance. As the top panels 15 of the honey frames 13 pass between the decapping reels 30, 31, said reels are separated automatically, in the manner described, so that the said upper panels 15 pass between the knife bars 35 on said reels 30, 31 with the requisite clearance to prevent damage to said panels and jamming of the machine.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a machine for decapping honeycomb at opposite sides of honeycomb frames having lateral upper projections at opposite ends thereof, vertically operating conveyor means mounted in upright position and attachable to said projections to suspend said frames and move the same in a vertical path, a drive for said conveyor means, means to decap the honeycomb at opposite sides of each frame simultaneously while the frame is being moved in suspended position comprising a pair of rotary power driven reels with honeycomb engaging knife bars thereon and mounted at opposite sides of the path of movement of said frames for movement outwardly of said path to disengage said knife bars from each honeycomb, and connections between said conveyor means and reels for moving said reels outwardly to disengage said knife bars from each honeycomb after decapping thereof.

2. In a machine for decapping honeycomb at opposite sides of honeycomb frames having lateral upper projections at opposite ends thereof, a pair of upright driven chain conveyors including lower end wheels and mounted in opposite relation for operation to lower said frames therebetween in a vertical path, said chains having apertures therein for engaging said projections to suspend said frames while being lowered and subsequently releasing said projections to drop said frames when said apertures round said wheels, honeycomb engaging and decapping means mounted at opposite sides of the path of movement of said frames for decapping the honeycomb at opposite sides of each frame simultaneously while the frame is being lowered in suspended position, and conveyor means mounted below the last named means to catch each honeycomb frame when dropped and transport the same away from said engaging and decapping means.

3. In a machine for decapping honeycomb in honeycomb frames having lateral upper projections at opposite ends thereof, a pair of upright driven chain conveyors including lower end wheels and mounted in opposite relation for operation to lower said frames therebetween in a vertical path, said chains having apertures therein for engaging said projections to suspend said frames while being lowered and subsequently releasing said projections to drop said frames when said apertures round said wheels, and honeycomb engaging and decapping means mounted at opposite sides of the path of movement of said frames for decapping the honeycomb at opposite sides of each frame simultaneously while the frame being lowered in suspended position.

4. In a machine for decapping honeycomb at opposite sides of honeycomb frames having lateral upper projections at opposite ends thereof, a pair of driven upright endless conveyors mounted in opposite relation to lower said frames therebetween in a vertical path, said conveyors having apertures therein for engaging said projections to suspend said frames while being lowered, said apertures being movable by travel of said conveyors clear of said projections to subsequently drop said frames, honeycomb engaging and decapping means mounted at opposite sides of the path of movement of said frames, for decapping the honeycomb at opposite sides of each frame simultaneously while the frame is being lowered is suspended position, and means to catch each dropped frame by the projections thereon and convey the same in suspended position away from said last named means comprising a pair of driven conveyor belts mounted below said last named means in laterally spaced relation to receive the dropped frame therebetween with the projections of the frame resting on said belts.

5. In a machine for decapping honeycomb at opposite sides of honeycomb frames having lateral upper projections at opposite ends thereof and a top panel overhanging the sides of the frame, a pair of driven upright endless conveyors mounted in opposite relation to lower said frames therebetween in a vertical path, said conveyors having apertures therein for engaging said projections to suspend said frames while being lowered, a pair of rotary driven decapping reels with decapping knife bars thereon slidably mounted at opposite sides of the path of movement of said frames for engagement with opposite sides of the honeycomb while each honeycomb frame is being lowered to simultaneously decap the honeycomb at opposite sides thereof, said reels being slidably movable outwardly of said path of movement to pass the overhanging top panel of each frame therebetween and prevent said reels from injuring said top panels, and means operative by said conveyors to slide said reels outwardly after each honeycomb has been decapped.

6. In a machine for decapping honeycomb at opposite sides of honeycomb frames having a top panel overhanging the sides of the frame, a pair of driven upright endless conveyors mounted in opposite relation to lower said frames therebetween in a vertical path, coengaging devices on said frames and conveyors, respectively, for suspending said frames from said conveyors while being lowered, a pair of rotary driven reels with decapping knife bars thereon, means slidably mounting said reels at opposite sides of said path for movement toward and away from each other to engage the honeycomb and pass the top panels of said frames therebetween, respectively, spring means for moving said reels toward each other, and means operative by said conveyors for moving said reels away from each other when each top panel is lowered into position to pass between the reels, whereby to prevent said reels from injuring said top panels.

7. A machine according to claim 6 wherein said last named means comprises toggle links connecting said reels and operative to move the reels away from each other, and connections between said conveyors and links for intermittently operating said links.

8. A machine according to claim 6 wherein said last named means comprises pairs of toggle links connecting together corresponding ends of the reels, and operative upwardly to move said reels away from each other, a pair of lift rods for operating the pairs of links slidably mounted in an upright position alongside the conveyors, and connections between the conveyors and the lift rods alongside the same.

9. A machine according to claim 6 wherein said last named means comprises pairs of toggle links connecting together corresponding ends of the reels and operative upwardly to move said reels away from each other, a pair of lift rods for operating the pairs of links slidably mounted in upright position alongside the conveyors, and tappet connections between the conveyors and the lift rods alongside the same.

THOMAS M. BOGENSCHUTZ.

REFERENCES CITED

The following references are of record in the file of this patent:

UNITED STATES PATENTS

| Number | Name | Date |
|---|---|---|
| 1,523,963 | Hodgson | Jan. 20, 1925 |